(12) United States Patent
Bengds et al.

(10) Patent No.: US 6,980,398 B2
(45) Date of Patent: Dec. 27, 2005

(54) DISPOSABLE LTO CARTRIDGE RETENTION SPRING CLEANER TOOL

(75) Inventors: Erik E. A. Bengds, Tucson, AZ (US); Kamal E. Dimitri, Tucson, AZ (US); Jerry W. Hammar, Tucson, AZ (US); Scott Richard Lockaby, Tucson, AZ (US); Wayne A. McKinley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/404,632

(22) Filed: Apr. 1, 2003

(65) Prior Publication Data

US 2004/0194802 A1    Oct. 7, 2004

(51) Int. Cl.[7] ................................................ G11B 3/58
(52) U.S. Cl. ...................................................... 360/137
(58) Field of Search ........................ 360/137; 369/292

(56) References Cited

U.S. PATENT DOCUMENTS

| 5,278,821 | A | * | 1/1994 | Kawamura et al. ........... 369/71 |
| 5,463,519 | A |   | 10/1995 | Dodt et al. .................. 360/128 |
| 5,547,142 | A |   | 8/1996 | Cheatham et al. ....... 242/338.1 |
| 5,930,089 | A |   | 7/1999 | Anderson .................... 360/128 |
| 6,219,201 | B1 |   | 4/2001 | Vaaler ......................... 360/132 |
| 6,333,831 | B1 | * | 12/2001 | Todd ........................... 360/128 |
| 6,414,816 | B2 |   | 7/2002 | Hikita .......................... 360/92 |
| 2004/0182421 | A1 | * | 9/2004 | Reasoner et al. ............. 134/15 |

FOREIGN PATENT DOCUMENTS

JP          60-160083 A  *  8/1985

* cited by examiner

Primary Examiner—Julie Anne Watko
(74) Attorney, Agent, or Firm—Scully, Scott, Murphy & Presser; Robert Sullivan

(57) ABSTRACT

An apparatus and a method for the cleaning of magnetic tape cartridge drive, particularly such as removable data-storage media tapes, and especially an arrangement and method of providing a disposable cartridge retention spring cleaning tool.

22 Claims, 2 Drawing Sheets

DISPOSABLE LTO CARTRIDGE RETENTION SPRING CLEANER TOOL

BACKGROUND OF THE INVENTION

1. Field of the Invention

Figure 1A:
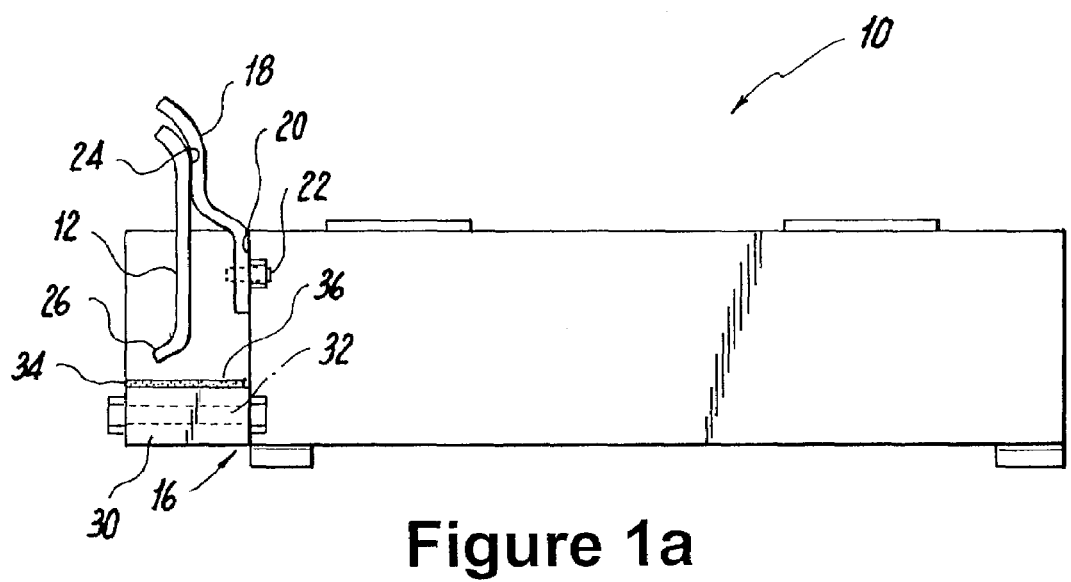

The present invention relates to an apparatus and to a method for the cleaning of magnetic tape cartridge drives, particularly such as but not limited to LTO drives, and especially pertains to an arrangement and method of providing a disposable LTO cartridge retention spring cleaning tool.

In the data processing technology, automated data-storage libraries are frequently utilized for the storage of various data media which are employed in data processing systems. Generally, such data processing systems necessitate the provision of considerable amounts of data-storage capacity which, upon occasion, may be needed rapidly, and stored in memory and hard disk drives, and whereby the various data may not be necessarily provided in a rapid manner. Consequently, data which is not required to be employed in an immediate manner may constitute frequently accessed data whereby the storage thereof may be in removable data-storage media, such as LTO (Linear Tape-Open) cartridges (Registered™ of Hewlett-Packard, IBM and Seagate), other magnetic tape cartridges, optical disk cartridges or the like, which are stored in automated data-storage libraries.

Ordinarily, such libraries provide an adequate amount of access to considerable quantities of the data-storage media, the latter of which are generally stored in storage shelves and are accessed by one or more accessors and delivered by therewith associated grippers or pickers to data-storage drives in the automated data-storage libraries. Potentially, an automated data-storage library may store in excess of 6,000 cartridges, which although not frequently accessed, may be needed rapidly at certain times. Basically, the accessors for conveying and transferring the data-storage media, for example; such as storage automation devices in the form of the 3584 Ultra Scalable Tape Library (a Trademark of IBM), employ cartridge and handling assemblies which are frequently referred to as either grippers or pickers in the technology. These electromechanical devices, in effect will grab or engage a cartridge for transport from one location to another such as for engagement with or disengagement from tape drives, whereby some type of calibration sensor is frequently mounted on the cartridge gripper or picker so as to be able to measure the relationship between the theoretical position and the actual position of the gripper. This, in essence, reduces the numerous physical tolerances encountered in the construction and functioning of the automatic data-storage library, and as a result reduces structural and operating expenditures, while concurrently improving upon the reliability in the handling and transporting of the tapes.

During the extensive operations of presently existing and widely utilized removable data-storage media, such as LTO tape cartridge, the latter incorporate cartridge retention springs which over the course of time and extended use may tend to collect debris, particular polycarbonate residues; in effect, during several loadings and unloadings of the LTO tape cartridge from and into the drives.

The tendency of the accumulation of this type of debris causes the tape gripper or picker extraction forces to rise beyond their normal permissible operating levels and specifications, potentially resulting in equipment failure, and also a lack of being able to pick up the tapes in a reliable and functionally dependable manner.

Although in various instances this accumulation of debris does not occur in some of the removable data-storage media; hereinafter merely described as but not limited to LTO tape drives, it is however, encountered on the high loading and unloading actions of the same cartridges while utilizing the same tape drive; in effect, representing a randomly encountered but nevertheless important problem in the technology.

Thus, in various types of automatic data-storage libraries, for instances such as the 3581 and 3583 tape libraries (trademarks of IBM), upon occasion the picker for the LTO tape drive has slipped due to the excessively high cartridge extraction forces which are exerted due to the accumulation or collection of debris especially on the cartridge retention spring. In some instances, the problem has been solved by manually cleaning the retention spring for the LTO tape drive through the intermediary of cotton swabs which are dipped in a cleaning solution; thereby enabling the picker to unload the cartridge. This, however, is a difficult problem to overcome in as much as the areas which require cleaning are normally somewhat inaccessible or somewhat difficult to reach by the manual cleaners which are currently available.

2. Discussion of the Prior Art

Although various types of cleaning methods and arrangements for different types of cartridges have been developed in the data storage technology, especially relative to the use thereof in automated data-storage libraries, these have not fully solved the problems encountered in satisfactorily and readily being able to clean LTO cartridge drive retention springs, and potentially other types of magnetic tape retention devices.

Hikata U.S. Pat. No. 6,414,816 B2 discloses an automated data-storage library apparatus wherein a cleaning tool employed for removing debris from a robotic hand is employed to pick and position tape cartridges in the apparatus, and wherein a controller automatically determines the need for cleaning based on the number of uses of the robotic hand. In essence, the cleaner is a cartridge device fixed in a storage cell for the magnetic tapes, and the cleaning action is implemented by the robot hand grasping the device and attempting to pull it out of the storage cell. This publication does not address itself to the problem of cleaning a device utilized for the retention of LTO cartridges at a remote and generally inaccessible location and is limited to a robotic hand primarily enabled to grasp cartridges.

Vaaler U.S. Pat. No. 6,219,201 B1 discloses a tape cartridge including a passive cleaner adapted to be employed in an automatic data-storage library, and wherein various collectors may be located inside a tape cartridge for collecting debris, such as wear particles, dust and dirt. These collectors may collectively comprise a double-sided adhesive tape applied to a tape shell, or an adhesive applied directly to a tape shell inner surface; a spool of a one sided adhesive on a backing with a portion spooled out sticky-side up and extending out of the cartridge so as to be able to be advanced in order to remove debris and expose a fresh section of tape; a porous material with or without an oily coating; a magnetic plug with or without an adhesive on a blunt tip which can be periodically removed from the cartridge for cleaning purposes; or an electrostatically-charged collector. This patent does not teach a method of cleaning a cartridge picking device but only provides materials for collecting debris; nor does it address itself to a cleaning method and arrangement analogous to that of the present invention which is directed to a device for contacting a cartridge retention spring and removing debris which has adhered hereto.

Anderson U.S. Pat. No. 5,930,089 discloses a head cleaner for linear tape drives, wherein an LTO head cleaning device consists of a brush constituted of nylon, carbon or steel fibers which may be contacted during periods while the tape is still in the tape drive. This patent fails to teach any method of positioning a cleaning device in relation to a remotely located surface, and wherein a cleaner brush is integral to a drive and pivots into place. There is no disclosure of the type of cleaning device or method analogous to that disclosed by the present invention.

Cheatham et al., U.S. Pat. No. 5,547,142 discloses a tape cassette with an internal tape cleaning and locking arrangement wherein a method is provided for cleaning debris off the tape of a reel-to-reel type tape, the cleaning being internal to the tape cartridge. Pads provided on pivot arms contact the tape while the latter is in a moving mode, and only teaches the use of a material for collecting debris while it does not address the problem of removing adhered debris or causing a cleaning device to come into a contact with a remotely located LTO cartridge retention spring.

Finally, Dodt et al., U.S. Pat. No. 5,463,519 discloses a method and apparatus for cleaning a tape path in a tape drive wherein a fabric tape coated with soft abrasive polymer coating or impregnated with a polymer with a cleaning solvent is employed for the effectuating of a cleaning action.

Although cleaning tape heads in other areas which are easily accessible by a cleaner is known, the prior art does not address the problem of removing debris from a cartridge retention spring which is not located in the tape path, and consequently does not concern itself with the solution in providing cleaning actions that are solved by the present invention.

SUMMARY OF THE INVENTION

Accordingly, in order to provide for any required cleaning of debris accumulated on removable data-storage media; for example, on LTO cartridge retention springs which are employed on cartridge pickers, the present invention is adapted to provide a method and a cleaning tool comprising, in one embodiment, a disposable rubber wheel which is adapted to clean the top edge of the spring where a buildup of contaminating materials or debris may be readily encountered.

Pursuant to the present invention there is accordingly provided a cleaning tool which is used as preventive maintenance for automatic data-storage tape libraries in relation to LTO cartridge retention springs in order to prevent customer downtime, and the high cost of service parts and replacement time.

In connection with the foregoing, the invention thus provides in one embodiment a manual cleaning tool, and in an alternative embodiment an automated cleaning tool for effectuating the cleaning and removal of accumulated debris from retention spring surfaces employed in cartridge pickers for LTO tape drives. In essence, pursuant to this embodiment of the invention, a tool with a disposable rubber wheel is employed to clean the top edge of the retention spring in a LTO tape drive, in which there may be encountered an undesirable and deleterious build-up of debris, such as polycarbonates and the like, tending to adversely affect the operation of the drive. The cleaning tool is employed as a preventive maintenance tool for tape libraries or autoloaders, and can be readily inserted into a tape drive manually, or by a picker, or alternatively, housed in the automated data-storage library in a specific selected bin or cell within the library. The tool may have the disposable roller covered with a sticky debris-adherent material, and with the roller being rotatably motorized through an energy-supplying battery which may be rechargeable as desired.

According, to a first embodiment of the invention, there may be provided a manual cleaning fixture with a removable scraper blade attached to the cleaner fixture which can be removed and then disposed after use. Also provided therein is a removable debris collector equipped with a sticky material which will collect the debris being scraped from the surfaces of the LTO cartridge retention spring.

Pursuant to a modified embodiment of the invention there is disclosed an automated fixture which includes a base with a carrier which rolls or slides into the LTO tape drive, this fixture being imparted an LTO cartridge profile in order to be able to be contacted by a picker. The carriage or carrier is equipped with a cleaning wheel or roller for removing debris from the cartridge retention spring, which roller may be driven by a motor connected to a rechargeable battery which energizes the motor.

BRIEF DESCRIPTION OF THE ACCOMPANYING DRAWINGS

Figure 1B:
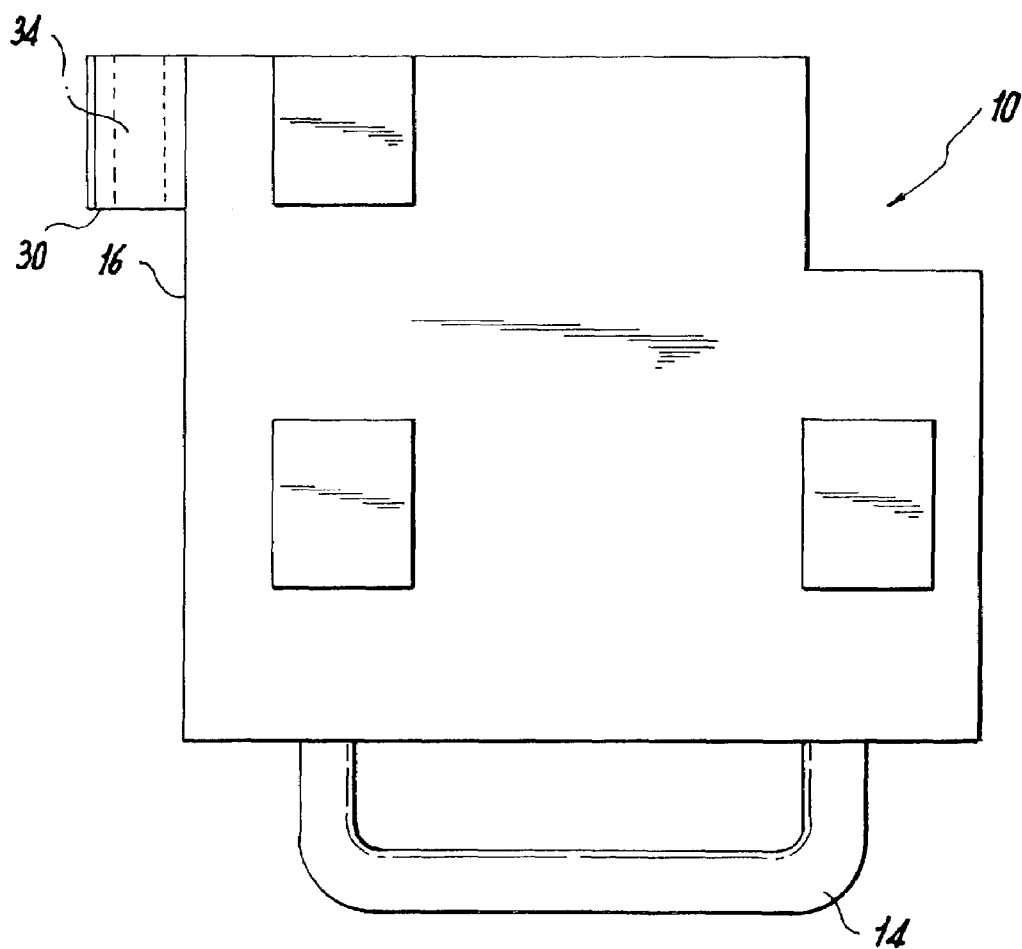
Figure 2:
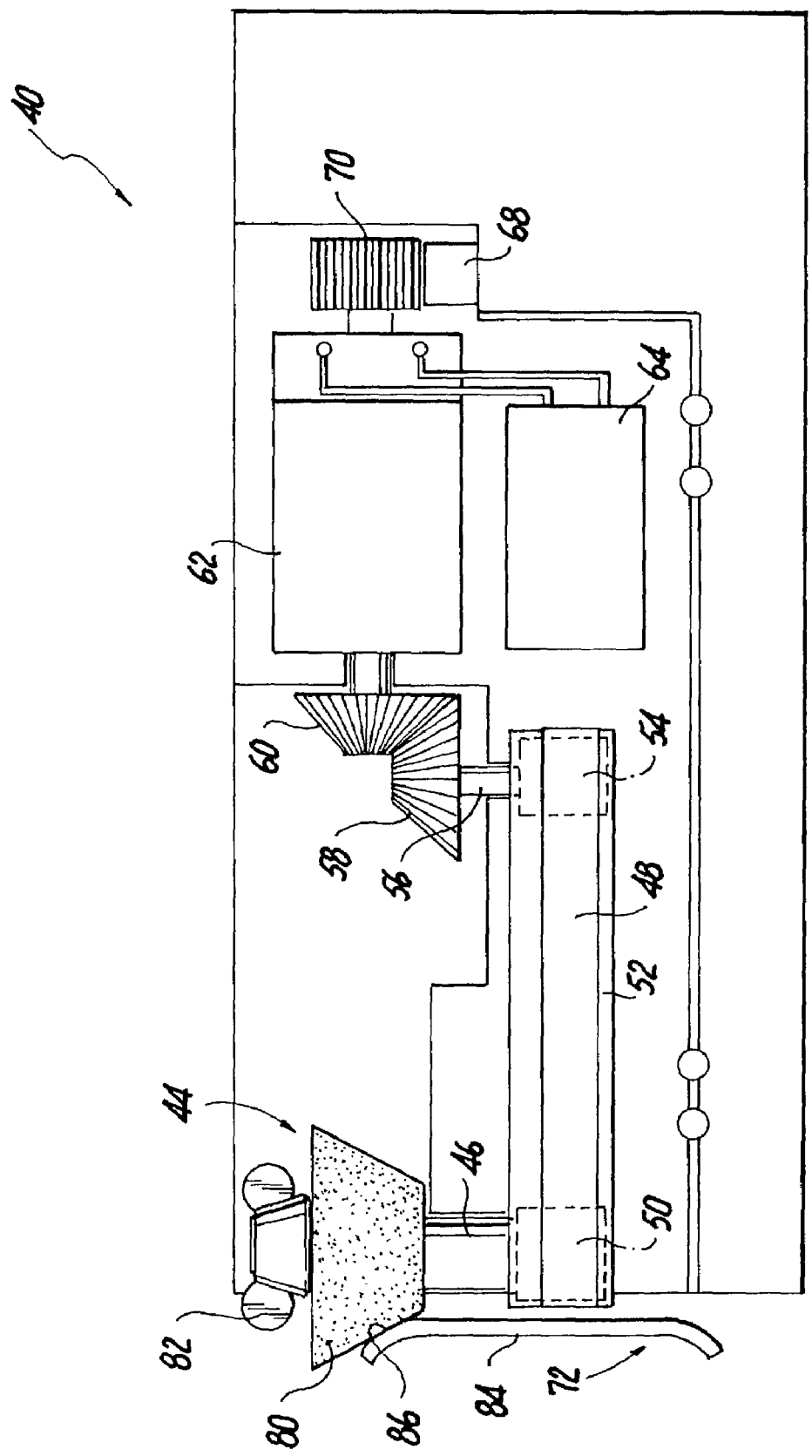

Reference may now be made to the following detailed description of preferred embodiments of the invention, taken in conjunction with the accompanying drawings; wherein:

FIGS. 1a and 1b illustrate, in respectively side and plan views, a generally diagrammatically represented manual cleaning device for cleaning the spring which is employed for removable data-storage media; such as LTO cartridge retention in contact with a tape drive; and FIG. 2 illustrates a modified embodiment of a retention spring cleaning device which is automated and motor driven in the operation thereof.

DETAILED DESCRIPTION OF PREFERRED EMBODIMENTS

Referring to FIGS. 1a and 1b of the drawings, there is illustrated a cleaner fixture 10 for an LTO cartridge drive retention spring 12, which fixture is insertable into a cell (such as of an automated data-storage library) possessing a tape drive (not shown). The fixture overall has the general shape of an LTO cartridge, or similarly configured magnetic tape cartridges or similar suitable removable data-storage media. The cleaner fixture includes a handle 14 at one end for manually manipulating the fixture into and out of the cell. One edge 16 of the cleaner fixture 10 mounts a cleaner arm 18 of bent protruding shape preferably a metallic element, which is attached to the end surface 20 of the fixture 10 by means of a holding screw 22. Cartridge retention spring 12 is designed to have the surface 24 thereof contacting the cleaner arm 18, whereby one depending end 26 thereof is in close proximity to a debris collecting block 30, which is fastened therebelow to the cleaner fixture end surface 20 through the intermediary of a further holding screw 32 extending through the collecting block 30.

The debris collecting block 30 possesses a surface 34 facing towards the lower end of the cartridge retention spring 12 which is covered with a suitable sticky material 36, such as an adhesive, for instance, acrylate or a rubber-based pressure-sensitive adhesive which will collect dropping debris being scraped from the retention spring surface 24 by the scraping action of the contacting cleaner arm 18 during the insertion of the cleaner fixture 10.

The foregoing cleaning action through insertion of the cleaner fixture 10 from a specific bin or cell into contact with a drive need only be implemented as desired or necessary possibly one time during every few thousand insertions or withdrawals (loads/unloads) of a tape cartridge into and from the drive, as in known instances, possibly for every 5,000 to 10,000, operating cartridge insertions/withdrawals on the average for best cases in which there is encountered a minimal build-up of debris or contaminants on the cartridge retention spring surface. It is also possible to implement such cleaning even prior to the first scheduled preventive maintenance, in that instance, there may be employed a cleaning routine based on a first load/unload (insertion/withdrawal) count occurrence for that particular drive (such as tagged cleaning algorithm for that drive specifying the routine count that is needed for cleaning that follows the drive), and which is used as an input to the automated data-storage library or auto-loader microcode.

The foregoing cleaner fixture 10 can be inserted in a drive via a cartridge picker and housed in the library in a specific known bin or storage cell in the automated data-storage library.

Pursuant to the embodiment as shown in FIG. 2 of the drawings, this pertains to an automated cleaner fixture 40 rather than the manual fixture 10 of FIGS. 1a and 1b. Hereby the cleaner fixture 40, which also possesses a cartridge-like exterior shape, incorporates a rotatable cleaning wheel 44 of a generally external frustoconical configuration. A shaft portion 46 thereof is connected to a belt drive 48 through a first pulley 50 which, in turn, is connected through timing belt 52 to a second pulley 54 attached by a shaft 56 to a bevel gear drive 58,60 connected to a motor 62 which is adapted to be energized through the intermediary of a rechargeable battery 64. The motor 62 may be double-ended whereby one end may move a carriage or carrier 68 for sliding the fixture 40 into an LTO cartridge tape drive (not shown) along a gear rack 70, such as perpendicular to the paper plane direction, with the gear rack being slightly longer than a debris-contaminated cartridge drive retention spring 72. The other end of the motor transmits rotary motion to the cleaning wheel 44 through the intermediary of the driving or timing belt 52.

In communication with the circumferential surface 80 of the cleaning wheel 44, the latter of which is fastened by means of a suitable wing nut 82 or the like to the belt drive or the pulley or shaft on the drive is the cartridge retention spring surface 84 whereby the edge or surface 86 of the cartridge retention spring forms a collection point or surface for debris or contaminants encountered during continuous operation which is intended to be scraped off and removed by means of contact with the circumferential surface 80 of the cleaning wheel 44. The outer wheel surface 80 may be of a rubber wheel with or without a mild abrasive added to the rubber along the surface, or may be a rubber wheel with a double sided pressure sensitive adhesive (PSA) being applied to extend about the circumference thereof in order to pick up any contaminating or debris-like material scraped from the contacting surface of the retention spring 72.

Thus, the foregoing structures 10, 40 will readily enable the removal of debris which may be deposited on the drive or cartridge retention spring, which is in a relatively inaccessible location for ordinary cleaning operations.

While the invention has been particularly shown and described with respect to preferred embodiments thereof, it will be understood by those skilled in the art that the foregoing and other changes in form and details may be made therein without departing from the spirit and scope of the invention.

What we claim is:

1. An arrangement for the removal of accumulated debris from a removable data-storage media cartridge drive retention spring; said arrangement comprising:
    a cleaner fixture having a cleaner arm connected thereto, said cleaner fixture being manually positionable to cause said cleaner arm to contact said retention spring so as to scrape debris from contacting surface portions of said retention spring; and
    debris collecting structure being fastened to said cleaner fixture below said cleaner arm and retention spring for collecting and discarding debris scraped from said retention spring by said cleaner arm.

2. An arrangement as claimed in claim 1, wherein said debris collecting structure comprises a disposable block which is detachably fastened to said cleaner fixture, said block comprising an adhesive surface facing toward said cleaner arm and retention spring for adherent receipt of scraped debris.

3. An arrangement as claimed in claim 2, wherein said adhesive surface on said block comprises a layer of a material selected from the group of materials consisting of acrylate or a rubber-based pressure-sensitive adhesive.

4. An arrangement as claimed in claim 1, wherein said cleaner arm comprises a disposable metallic scraper blade which is detachably fastened to said cleaner fixture.

5. An arrangement as claimed in claim 1, wherein said cleaner fixture comprises an external configuration which is substantially commensurate with the external dimensions of an LTO cartridge for an automated data-storage library.

6. An arrangement for the removal of accumulated debris from a removable data-storage media cartridge drive retention spring, wherein said arrangement comprises an automated cleaner fixture insertable into tape drives of an automated data-storage library; comprising:
    a rotatable wheel of said cleaner fixture for contacting surface portions of said retention spring for abrading or scraping accumulated debris from said retention spring surface portions; and
    drive means operatively connected to said rotatable wheel for imparting rotation to said wheel for scraping said debris from therewith contacting surface portions of said retention spring.

7. An arrangement as claimed in claim 6, wherein said rotatable wheel is disposable and possesses a sticky circumferential surface contacting said retention spring surface portions, said sticky surface being a layer selected from the group of materials consisting of rubber, rubber incorporating an abrasive substance, and rubber having a double-sided pressure-sensitive adhesive applied thereto.

8. An arrangement as claimed in claim 6, wherein said drive means comprises a battery-powered motor; and a drive belt connecting said rotatable wheel to an output drive of said motor for imparting rotation to said wheel in response to operation of said motor.

9. An arrangement as claimed in claim 8, wherein said wheel is connected to a pulley, said output drive of the motor comprising a gear arrangement connected to a further pulley, said drive belt operatively extending between said pulleys.

10. An arrangement as claimed in claim 9, wherein a gear rack structure operatively connected to said motor conveys said cleaner fixture having an LTO cartridge profile along a carrier into contact with an LTO drive so as to enable said rotatable wheel to contact said surface portions of the retention spring.

11. An arrangement as claimed in claim 10, wherein said cleaner fixture is periodically operated in conformance with a preventive maintenance algorithm based on an initial occurrence of a debris-ascertaining cartridge loading and unloading count into an LTO library.

12. A method for the removal of accumulated debris from a removable data-storage media cartridge drive retention spring; said method comprising:
providing a cleaner fixture having a cleaner arm connected thereto, said cleaner fixture being manually positioned to cause said cleaner arm to contact said retention spring so as to scrape debris from contacting surface portions of said retention spring; and
fastening debris collecting structure to said cleaner fixture below said cleaner arm and retention spring for collecting and discarding debris scraped from said retention spring by said cleaner arm.

13. A method as claimed in claim 12, wherein said debris collecting structure comprises a disposable block which is detachably fastened to said cleaner fixture, said block comprising an adhesive surface facing toward said cleaner arm and retention spring for adherent receipt of scraped debris.

14. A method as claimed in claim 13, wherein said adhesive surface on said block comprises a layer of a material selected from the group of materials consisting of acrylate or a rubber-based pressure-sensitive adhesive.

15. A method as claimed in claim 12, wherein said cleaner arm comprises a disposable metallic scraper blade which is detachably fastened to said cleaner fixture.

16. A method as claimed in claim 12, wherein said cleaner fixture comprises an external configuration which is substantially commensurate with the external dimensions of an LTO cartridge for an automated data-storage library.

17. A method for the removal of accumulated debris from a removable data-storage media cartridge drive retention spring, wherein said arrangement comprises an automated cleaner fixture insertable into tape drives of an automated data-storage library; said method comprising:
providing a rotatable wheel of said cleaner fixture for contacting surface portions of said retention spring for abrading or scraping accumulated debris from said retention spring surface portions; and
operatively connecting drive means to said rotatable wheel for imparting rotation to said wheel for scraping said debris from therewith contacting surface portions of said retention spring.

18. A method as claimed in claim 17, wherein said rotatable wheel is disposable and possesses a sticky circumferential surface contacting said retention spring surface portions, said sticky surface being a layer selected from the group of materials consisting of rubber, rubber incorporating an abrasive substance, and rubber having a double-sided pressure-sensitive adhesive applied thereto.

19. A method as claimed in claim 17, wherein said drive means comprises a battery-powered motor; and a drive belt connecting said rotatable wheel to an output drive of said motor for imparting rotation to said wheel in response to operation of said motor.

20. A method as claimed in claim 19, wherein said wheel is connected to a pulley, said output drive of the motor comprising a gear arrangement connected to a further pulley, said drive belt operatively extending between said pulleys.

21. A method as claimed in claim 20, wherein a gear rack structure operatively connected to said motor conveys said cleaner fixture having an LTO cartridge profile along a carrier into contact with an LTO drive so as to enable said rotatable wheel to contact said surface portions of the retention spring.

22. A method as claimed in claim 21, wherein said cleaner fixture is periodically operated in conformance with a preventive maintenance algorithm based on an initial occurrence of a debris-ascertaining cartridge loading and unloading count into the data-storage library.

* * * * *